United States Patent
Hagen et al.

(10) Patent No.: US 12,517,284 B2
(45) Date of Patent: Jan. 6, 2026

(54) VEHICLE PANE WITH REDUCED EMISSIVITY AND LIGHT REFLECTION

(71) Applicant: SAINT-GOBAIN GLASS FRANCE, Courbevoie (FR)

(72) Inventors: Jan Hagen, Bonn (DE); Pauline Girard, Compiegne (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 225 days.

(21) Appl. No.: 17/791,427

(22) PCT Filed: Jan. 12, 2021

(86) PCT No.: PCT/EP2021/050463
§ 371 (c)(1),
(2) Date: Jul. 7, 2022

(87) PCT Pub. No.: WO2021/156023
PCT Pub. Date: Aug. 12, 2021

(65) Prior Publication Data
US 2023/0039752 A1 Feb. 9, 2023

(30) Foreign Application Priority Data
Feb. 6, 2020 (EP) .................................... 20155756

(51) Int. Cl.
*G02B 1/11* (2015.01)
*B60J 3/00* (2006.01)
(Continued)

(52) U.S. Cl.
CPC ............... *G02B 1/11* (2013.01); *B60J 3/007* (2013.01); *C03C 17/3417* (2013.01); *G02B 5/20* (2013.01);
(Continued)

(58) Field of Classification Search
CPC ............... B60J 3/007; C03C 17/3417; C03C 17/3435; C03C 2217/213; C03C 2217/425;
(Continued)

(56) References Cited

U.S. PATENT DOCUMENTS

2010/0101649 A1 4/2010 Huignard et al.
2014/0037841 A1* 2/2014 Jewhurst ............... G02B 1/113
427/164

(Continued)

FOREIGN PATENT DOCUMENTS

CN 203371863 U 1/2014
CN 103553357 A 2/2014
(Continued)

OTHER PUBLICATIONS

International Search Report as issued in International Patent Application No. PCT/EP2021/050463, dated Mar. 4, 2021.

*Primary Examiner* — Hai Vo
(74) *Attorney, Agent, or Firm* — Pillsbury Winthrop Shaw Pittman LLP

(57) ABSTRACT

A vehicle pane with reduced emissivity and light reflection, includes a substrate having an exposed interior-side surface, an emissivity-reducing coating containing at least one layer based on a transparent conductive oxide (TCO) on the interior-side surface, and an anti-reflection coating based on nanoporous silicon oxide on the emissivity-reducing coating.

16 Claims, 2 Drawing Sheets

Figure 1:
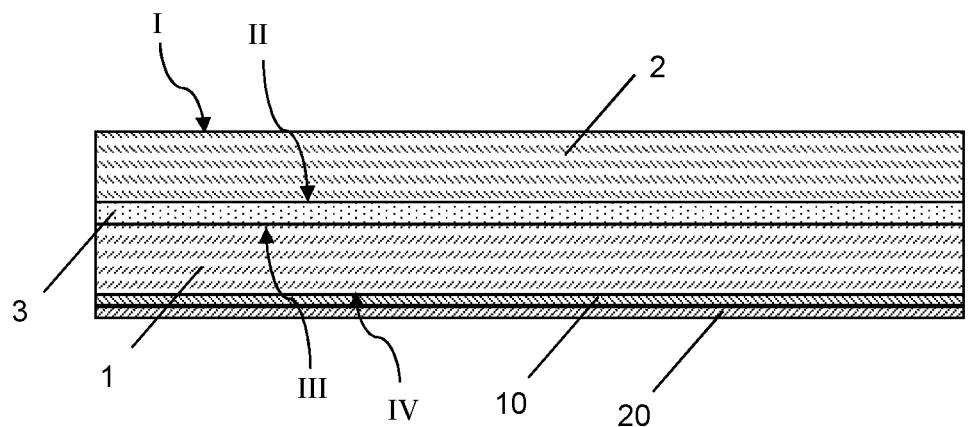

(51) Int. Cl.
*C03C 17/34* (2006.01)
*G02B 5/20* (2006.01)

(52) U.S. Cl.
CPC ............. *C03C 2217/213* (2013.01); *C03C 2217/734* (2013.01); *C03C 2217/948* (2013.01)

(58) Field of Classification Search
CPC ........ C03C 2217/732; C03C 2217/734; C03C 2217/94; C03C 2217/948; G02B 1/11; G02B 5/20
See application file for complete search history.

(56) References Cited

U.S. PATENT DOCUMENTS

| | | | | |
|---|---|---|---|---|
| 2014/0147654 A1* | 5/2014 | Walther | ............. | C23C 18/1212 428/448 |
| 2016/0025899 A1* | 1/2016 | Ishizeki | ................... | G02B 1/18 428/141 |
| 2020/0124771 A1* | 4/2020 | Hagen | ..................... | G02B 1/116 |

FOREIGN PATENT DOCUMENTS

| | | |
|---|---|---|
| CN | 109219584 A | 1/2019 |
| CN | 110650844 A | 1/2020 |
| EP | 2 141 135 A1 | 1/2010 |
| IN | 201737032393 A | 9/2017 |
| JP | 2007-501766 A | 2/2007 |
| JP | 2008-233757 A | 10/2008 |
| JP | 2010-509175 A | 3/2010 |
| JP | 2018-162050 A | 10/2018 |
| WO | WO 2008/059170 A2 | 5/2008 |
| WO | WO 2011/105991 A1 | 9/2011 |
| WO | WO 2012/086806 A1 | 6/2012 |
| WO | WO 2013/131667 A1 | 9/2013 |
| WO | WO 2016/184732 A1 | 11/2016 |
| WO | WO 2018/206236 A1 | 11/2018 |

* cited by examiner

VEHICLE PANE WITH REDUCED EMISSIVITY AND LIGHT REFLECTION

CROSS-REFERENCE TO RELATED APPLICATIONS

This application is the U.S. National Stage of PCT/EP2021/050463, filed Jan. 12, 2021, which in turn claims priority to European patent application number 20 155 756.8 filed Feb. 6, 2020. The content of these applications are incorporated herein by reference in their entireties.

The invention relates to a vehicle pane with reduced emissivity and light reflection, as well as production and use thereof.

The interior of a motor vehicle or a building can become very hot in summer when ambient temperatures are high and direct sunlight is intense. If, on the other hand, the outside temperature is lower than the temperature in the interior, which occurs in particular in winter, a cold pane acts as a heat sink that is perceived as unpleasant. The interior must also be heated greatly to avoid cooling through the window panes.

To counter this problem, panes with reduced emissivity are known. Such panes have an emissivity-reducing coating on their interior-side surface. Such coatings are also known as low-E coatings and have reflective properties against thermal radiation. When outside temperatures are high, the coating prevents the thermal radiation emitted by the heated pane from entering the interior, which is separated from the external environment by the pane. In addition, part of the infrared solar radiation is reflected. When outside temperatures are low, the coating reduces the heat transfer from the heated interior through the pane into the external environment. Overall, thermal comfort is improved by such a pane with reduced emissivity.

Panes with reduced emissivity are used in the automotive sector, in particular as roof panels. Emissivity-reducing coatings suitable for this are known, for example, from EP2141135A1, WO2011105991A1, WO2013131667A1, and WO2018206236A1.

The emissivity-reducing coatings can have the disadvantage of providing the pane with a certain interior-side light reflection, in particular at shallow reflection angles. This can lead to disturbing effects. For example, the display of the navigation system or other electronic displays can be reflected on the roof panel, which can be disturbing for people in the back seat.

Various anti-reflection coatings by means of which the light reflection of a glass pane can be reduced are known. Anti-reflection coatings can be implemented as a layer sequence with alternating layers with different refractive indices, whereby the light reflection is reduced by interference effects. In addition, porous silicon oxide layers are known as anti-reflection layers. These can be formed from the glass surface by etching. Alternatively, the porous silicon oxide layers can also be produced by sol-gel methods. Such an anti-reflection coating is known, for example, from WO2008059170A2.

The object of the present invention is to provide an improved vehicle pane having an emissivity-reducing coating which has less interior-side light reflection. In addition, an economical, industrially feasible method is to be provided for producing the vehicle pane with high quality and long-term stability.

The object is accomplished by a vehicle pane with reduced emissivity and light reflection according to claim 1. Preferred embodiments emerge from the dependent claims.

The vehicle pane according to the invention with reduced emissivity and light reflection comprises at least:
- a substrate having an exposed interior-side surface,
- an emissivity-reducing coating containing at least one layer based on a transparent conductive oxide (TCO) on the interior-side surface,
- an anti-reflection coating based on nanoporous silicon oxide on the emissivity-reducing coating.

The invention further includes a method for producing a vehicle pane with reduced emissivity and light reflection, wherein
  (a) an emissivity-reducing coating that includes at least one layer based on a transparent conductive oxide (TCO) is applied to an exposed interior-side surface of a substrate; and
  (b) an anti-reflection coating based on nanoporous silicon oxide is deposited on the emissivity-reducing coating.

The invention is based on the combination of the emissivity-reducing coating with the special anti-reflection layer formed from nanoporous silicon oxide. The light reflection of the interior-side surface is effectively reduced such that fewer disturbing reflections occur. The anti-reflection coating according to the invention has high mechanical and chemical stability and is not very sensitive to water or organic contaminants. Compared to other anti-reflection coatings, in particular interference layer systems composed of alternating layers with different refractive indices, the nanoporous anti-reflection coating according to the invention has a number of advantages. For example, its production is associated with significantly lower costs. In addition, the anti-reflective properties are provided over a large range of incidence angles. Furthermore, better anti-reflective effects can be achieved because an interference layer system for optimum anti-reflection coating of a glass surface (refractive index 1.5) would require a low-refractive layer with a refractive index below 1.5. Most suitable for this are fluorides (for example, magnesium fluoride), which are not sufficiently resistant to external influences and cannot be deposited with magnetron-enhanced cathodic sputtering, which is, however, the usual method for producing these coatings. With the coating according to the invention, anti-reflection coating is easily possible. These are major advantages of the present invention.

In the following, the vehicle pane is also referred to simply as "pane". The pane according to the invention is in particular a window pane and is intended, in an opening of a vehicle, to separate the interior from the external environment. The pane is particularly preferably a window pane for a motor vehicle, in particular for a passenger car, for example, a roof panel, windshield, side pane, or rear pane. The pane is preferably curved, as is customary in the automotive sector. The interior-side surface of the substrate is usually concavely curved.

In the context of the invention, an "interior-side surface" means that surface that is intended to face the interior in the installed position. An "exterior-side surface" means that surface that is intended to face the external environment in the installed position.

The pane according to the invention can be implemented as a single glass pane and thus comprise the substrate as a single pane. The substrate is preferably prestressed, in particular thermally prestressed. The pane is then a so-called single pane safety glass (ESG). However, the pane according to the invention can also be implemented as a laminated pane. The pane is then a so-called laminated safety glass (VSG). In this case, the substrate is the inner pane, because only this has an exposed interior-side surface. The substrate is joined to an outer pane via a thermoplastic intermediate layer. The "inner pane" is the pane of the laminated pane that faces the interior in the installed position. The "outer pane" is the pane of the laminated pane that faces the external environment in the installed position.

In the context of the invention, an "exposed surface" is a surface that is accessible and has direct contact with the surrounding atmosphere. It can also be referred to as an "external surface". An exposed surface is distinguished from internal surfaces of a laminated pane that are joined to one another via the thermoplastic intermediate layer. If the pane is implemented as a single glass pane, both surfaces of the substrate are exposed. If the pane is implemented as a laminated pane, the exterior-side surface of the outer pane and the interior-side surface of the inner pane (i.e., of the substrate according to the invention) are exposed.

According to the invention, an emissivity-reducing coating is applied to the exposed interior-side surface of the substrate. The emissivity-reducing coating can also be referred to as a thermal radiation reflective coating, low-emissivity coating, or low-E coating. Emissivity is the measure that indicates how much thermal radiation the pane emits into an interior space in the installed position compared to an ideal heat emitter (a black body). The emissivity-reducing coating has the function of preventing the radiation of heat into the interior (IR components of solar radiation and, in particular, the thermal radiation of the pane itself) and also to prevent radiation of heat out of the interior. It has reflective properties against infrared radiation, in particular against thermal radiation in the spectral range from 5 µm-50 µm (cf. also standard DIN EN 12898:2019-06). This effectively improves the thermal comfort in the interior. The emissivity-reducing coating according to the invention can at least partially reflect the thermal radiation radiated by the entire pane in the direction of the interior particularly effectively in the case of high outside temperatures and solar radiation. With low outside temperatures, the coating according to the invention can effectively reflect the thermal radiation emitted from the interior and thus reduce the effect of the cold pane as a heat sink. The surfaces of a glazing are customarily numbered consecutively from the outside to the inside such that the interior-side surface of single glazings is referred to as "side 2" or "side II"; with double glazings (for example, laminated glass or insulating glazing units), as "side 4" or "side IV".

According to the invention, the emissivity-reducing coating contains at least one layer based on a transparent conductive oxide, which provides reflective properties relative to thermal radiation. The layer based on the transparent conductive oxide is also referred to in the following as a TCO layer. TCO layers are corrosion resistant and can be used on exposed surfaces. In addition, the emissivity-reducing coating can have further layers, in particular dielectric layers, which, for example, improve the visual appearance or prevent or control diffusion.

The TCO layer preferably has a refractive index of 1.7 to 2.3. The TCO layer can, for example, be based on indium tin oxide (ITO), mixed indium zinc oxide (IZO), aluminium-doped zinc oxide (AZO), gallium-doped zinc oxide (GZO), fluorine-doped tin oxide (FTO, $SnO_2$:F), or antimony doped tin oxide (ATO, $SnO_2$:Sb).

In a first advantageous embodiment, the TCO layer is based on fluorine-doped tin oxide (FTO, $SnO_2$:F) or antimony-doped tin oxide (ATO, $SnO_2$:Sb) and has a thickness of 100 nm to 600 nm. In this case, the layer based on fluorine- or antimony-doped tin oxide is preferably the only layer of the emissivity-reducing coating, i.e., the emissivity-reducing coating is formed by the TCO layer alone. In other words, the emissivity-reducing coating consists of only the TCO layer. However, alternatively, the coating can also include other layers, in particular layers under the TCO layer. Such sublayers can, for example, influence the colouration or the adhesion of the coating. The layer based on fluorine-doped or antimony-doped tin oxide is preferably deposited on the substrate surface pyrolytically or by chemical vapour deposition (CVD), particularly preferably as part of a float glass process during production of the substrate. FTO and ATO are common TCOs for coatings in the float process. In pyrolytic processes, a solution is typically poured onto the hardening float glass pane. In CVD processes, the glass is typically introduced for coating after the float bath. Such a coating has good emissivity-reducing properties and can be applied economically and in a time-saving manner as part of industrial mass production.

In a second advantageous embodiment, the emissivity-reducing coating is a sequence of thin layers (layer structure, layer stack). While the emissivity-reducing properties are ensured by the TCO layer, the optical properties, in particular, transmittance and reflectivity are significantly influenced by the other layers and can be specifically adjusted by their design. So-called antireflection layers, which have a lower refractive index than the TCO layer and are arranged below and above it, have a particular influence in this context. These anti-reflection layers can increase transmittance through the pane and reduce reflectivity, in particular as a result of interference effects. The effect depends crucially on the refractive index and layer thickness. In an advantageous embodiment, the coating includes, in each case, at least one anti-reflection layer below and above the TCO layer, with the anti-reflection layers having a lower refractive index than the TCO layer, preferably a refractive index of at most 1.8, in particular of at most 1.6.

In the second advantageous embodiment, the TCO layer is preferably based on indium tin oxide (ITO), which has proved to be particularly suitable, in particular due to low specific resistance and low scattering in terms of sheet resistance, which is advantageous for consistent emissivity-reducing properties. The thickness of the TCO layer (ITO layer) is preferably from 50 nm to 150 nm, particularly preferably from 60 nm to 100 nm, for example, from 65 nm to 80 nm. This yields particularly good results in terms of the emissivity-reducing effect with, at the same time, sufficient optical transparency.

In the second advantageous embodiment, the emissivity-reducing coating preferably includes a dielectric lower anti-reflection layer arranged below the TCO layer. The refractive index of the lower anti-reflection layer is preferably 1.8 at most, particularly preferably from 1.3 to 1.8. The thickness of the lower anti-reflection layer is preferably from 5 nm to 100 nm, preferably from 10 nm to 50 nm.

The emissivity-reducing coating also preferably includes a dielectric upper anti-reflection layer arranged above the TCO layer. The refractive index of the upper anti-reflection layer is preferably 1.8 at most, particularly preferably from 1.3 to 1.8. The thickness of the upper anti-reflection layer is preferably from 10 nm to 100 nm, particularly preferably from 30 nm to 70 nm, for example, from 35 nm to 50 nm.

In a particularly advantageous embodiment, the coating has both a lower anti-reflection layer below the electrically conductive layer and an upper anti-reflection layer above the electrically conductive layer.

In particular, the anti-reflection layers produce advantageous optical properties of the pane. They reduce the reflectance and thus increase the transparency of the pane and ensure a neutral colour impression. The anti-reflection layers preferably contain an oxide or fluoride, particularly preferably silicon oxide ($SiO_2$). The silicon oxide can have dopants and is preferably doped with aluminium ($SiO_2$:Al), with boron ($SiO_2$:B), with titanium ($SiO_2$:Ti), or with zirconium ($SiO_2$:Zr). Alternatively, however, the layers can also contain, for example, aluminium oxide, magnesium fluoride, or calcium fluoride.

It has been shown that the oxygen content of the TCO layer (in particular ITO layer) has a substantial influence on its properties, in particular transparency and conductivity. The production of the pane typically includes a temperature treatment, for example, a thermal tempering process or a bending process, wherein oxygen can diffuse to the TCO layer and oxidise it. In an advantageous embodiment, the coating includes, between the TCO layer and the upper anti-reflection layer, a dielectric barrier layer to regulate oxygen diffusion with a refractive index of at least 1.9. The barrier layer serves to adjust the oxygen supply to an optimal level.

The dielectric barrier layer to regulate oxygen diffusion contains at least a metal, a nitride, or a carbide. The barrier layer can contain, for example, titanium, chromium, nickel, zirconium, hafnium, niobium, tantalum, or tungsten, or a nitride or carbide of tungsten, niobium, tantalum, zirconium, hafnium, chromium, titanium, silicon, or aluminium. In a preferred embodiment, the barrier layer contains silicon nitride ($Si_3N_4$) or silicon carbide, in particular silicon nitride ($Si_3N_4$), with which particularly good results are obtained. The silicon nitride can have dopants and, in a preferred further development, is doped with aluminium ($Si_3N_4$:Al), with zirconium ($Si_3N_4$:Zr), with titanium ($Si_3N_4$:Ti), or with boron ($Si_3N_4$:B). During a temperature treatment after the application of the coating according to the invention, the silicon nitride can be partially oxidised. A barrier layer deposited as $Si_3N_4$ then contains, after the temperature treatment, $Si_xN_yO_z$, wherein the oxygen content is typically from 0 atom-% to 35 atom-%.

The thickness of the barrier layer is preferably from 5 nm to 20 nm, particularly preferably from 7 nm to 12 nm, for example, from 8 nm to 10 nm. This regulates the oxygen content of the TCO layer (in particular ITO layer) in a particularly advantageous manner. The thickness of the barrier layer is selected with a view to the oxygen diffusion, less with a view to the optical properties of the pane. However, it has been shown that barrier layers within the range indicated are compatible with the coating according to the invention and its optical requirements.

In the second advantageous embodiment, the emissivity-reducing coating preferably includes a dielectric blocking layer against alkali diffusion below the electrically conductive layer and, optionally, below the lower anti-reflection layer. The blocking layer reduces or prevents the diffusion of alkali ions from the glass substrate into the layer system. Alkali ions can negatively affect the properties of the coating. Furthermore, the blocking layer, in interaction with the lower anti-reflection layer, contributes advantageously to the adjustment of the optics of the overall layer structure. The refractive index of the blocking layer is preferably at least 1.9. The blocking layer preferably contains an oxide, a nitride, or a carbide, preferably of tungsten, chromium, niobium, tantalum, zirconium, hafnium, titanium, silicon, or aluminium, for example, oxides such as $WO_3$, $Nb_2O_5$, $Bi_2O_3$, $TiO_2$, $Ta_2O_5$, $Y_2O_3$, $ZrO_2$, $HfO_2$ $SnO_2$, or $ZnSnO_x$, or nitrides such as AlN, TiN, TaN, ZrN, or NbN. The blocking layer particularly preferably contains silicon nitride ($Si_3N_4$), with which particularly good results are achieved. The silicon nitride can have dopants and is, in a preferred further development, doped with aluminium ($Si_3N_4$:Al), with titanium ($Si_3N_4$:Ti), with zirconium ($Si_3N_4$:Zr), or with boron ($Si_3N_4$:B). The thickness of the blocking layer is preferably from 10 nm to 50 nm, particularly preferably from 20 nm to 40 nm, for example, from 25 nm to 35 nm. The blocking layer is preferably the bottom layer of the layer stack, i.e., has direct contact with the substrate surface, where it can optimally develop its effect.

In a particularly preferred embodiment of the second advantageous embodiment, the emissivity-reducing coating comprises the following layers, starting from the substrate:
  a blocking layer against alkali diffusion with a refractive index of at least 1.9,
  a lower anti-reflection layer with a refractive index of at most 1.8,
  the layer based on a transparent conductive oxide, which is indium tin oxide (ITO),
  a barrier layer to regulate oxygen diffusion with a refractive index of at least 1.9,
  an upper anti-reflection layer with a refractive index of at most 1.8.

With regard to the preferred layer thicknesses, the statements made above concerning the respective individual layers apply.

In a particularly preferred embodiment of the second advantageous embodiment, the coating consists exclusively of layers with a refractive index of at least 1.9 or of at most 1.8, preferably at most 1.6. In a particularly preferred embodiment, the coating consists only of the layers described and contains no further layers. The coating then consists of the following layers in the order indicated, starting from the substrate surface:
  blocking layer against alkali diffusion
  lower anti-reflection layer
  TCO layer, in particular ITO layer
  barrier layer to regulate oxygen diffusion
  upper anti-reflection layer With regard to the preferred layer thicknesses and materials, the statements made above concerning the respective individual layers apply.

The layers in the second advantageous embodiment are preferably deposited by magnetron-enhanced cathodic sputtering. This is particularly advantageous in terms of simple, fast, economical, and uniform coating of the substrate. The cathodic sputtering is carried out in a protective gas atmosphere, for example, of argon, or in a reactive gas atmosphere, for example, by addition of oxygen or nitrogen. However, the layers can also be applied by other methods known to the person skilled in the art, for example, by vapour deposition or chemical vapour deposition (CVD), by atomic layer deposition (ALD), by plasma enhanced chemical vapour deposition (PECVD) or by wet chemical methods.

A third advantageous embodiment can also be considered a further development of the second advantageous embodiment. The third advantageous embodiment comprises all layers of the second advantageous embodiment, but not the upper anti-reflection layer. It has been shown that the upper anti-reflection layer can be dispensed with because its function is fulfilled by the anti-reflection coating deposited above it. The statements concerning the second advantageous embodiment, in particular with regard to preferred materials and layer thicknesses of the individual layers apply mutatis mutandis to the third advantageous embodiment. The emissivity-reducing coating particularly preferably comprises the following layers, starting from the substrate:

a blocking layer against alkali diffusion with a refractive index of at least 1.9, a lower anti-reflection layer with a refractive index of at most 1.8, the layer based on a transparent conductive oxide, which is indium tin oxide (ITO), a barrier layer to regulate oxygen diffusion with a refractive index of at least 1.9.

In a particularly preferred configuration of the third advantageous embodiment, the coating consists exclusively of layers with a refractive index of at least 1.9 or of at most 1.8, preferably at most 1.6. In a particularly preferred embodiment, the coating consists only of the layers described and contains no further layers. The coating then consists of the following layers in the order indicated, starting from the substrate surface:

blocking layer against alkali diffusion
lower anti-reflection layer
TCO layer, in particular ITO layer
barrier layer to regulate oxygen diffusion After application of the emissivity-reducing coating, the pane is subjected to a temperature treatment, which, in particular, improves the crystallinity of the TCO layer. The temperature treatment is preferably carried out at at least 300° C. In particular, the temperature treatment reduces the sheet resistance of the coating. In addition, the optical properties of the pane are significantly improved; in particular, the transmittance is increased. The temperature treatment can be carried out in various ways, for example, by heating the pane using a furnace or a radiant heater. Alternatively, the temperature treatment can also be carried out by irradiation with light, for example, with a lamp or laser as a light source. However, the temperature treatment need not be performed as a separate step, but can also be done, for example, as part of a bending process or a thermal tempering process or as part of the production of the anti-reflection coating.

According to the invention, an anti-reflection coating is arranged above the emissivity-reducing coating. Preferably, the anti-reflection coating is deposited directly on the emissivity-reducing coating, i.e., no further layers are arranged between the emissivity-reducing coating and the anti-reflection coating. Preferably, the anti-reflection coating is the uppermost coating of the substrate, i.e., no further layers are arranged above the anti-reflection coating.

The anti-reflection coating according to the invention is based on nanoporous silicon oxide. The anti-reflective effect is determined, on the one hand, by the refractive index and, on the other, by the thickness of the anti-reflection coating. The refractive index in turn is a function of the pore size and the density of the pores. In a preferred embodiment, the pores are dimensioned and distributed such that the refractive index is from 1.2 to 1.4, particularly preferably from 1.25 to 1.35. The thickness of the anti-reflection coating is preferably from 30 nm to 500 nm, particularly preferably from 50 nm to 150 nm. Good anti-reflective properties are thus achieved.

The silicon oxide can be doped, for example, with aluminium, zirconium, titanium, boron, tin, or zinc. In particular, the optical, mechanical, and chemical properties of the coating can be adapted by dopants.

The anti-reflection coating preferably comprises only a homogeneous layer of nanoporous silicon oxide. However, it is also possible to form the anti-reflection coating from multiple layers of nanoporous silicon oxide which differ from one another, for example, in terms of porosity (size and/or density of the pores). In this way, a progression of refractive indices can be generated, as it were.

The pores are in particular closed nanopores, but can also be open pores. The term "nanopores" means pores that have sizes in the manometer range, i.e., from 1 nm to less than 1000 nm (1 μm). The pores preferably have a substantially circular cross-section (spherical pores), but can also have other cross-sections, for example, an elliptical, oval, or elongated cross-section (ellipsoid or ovoid pores). Preferably, at least 80% of all pores have substantially the same cross-sectional shape. It can be advantageous for the pore size to be at least 20 nm or even at least 40 nm. The average size of the pores is preferably from 1 nm to 500 nm, particularly preferably from 1 nm to 100 nm, most particularly preferably from 20 nm to 80 nm. the term "size of the pores" means the diameter in the case of circular pores; the greatest length in the case of pores of another shape. Preferably, at least 80% of all pores have sizes in the ranges indicated; particularly preferably, the sizes of all pores are within the ranges indicated. The proportion of pore volume in the total volume is preferably between 10% and 90%, particularly preferably less than 80%, most particularly preferably less than 60%.

The anti-reflection coating is in particular a sol-gel coating. It is deposited on the emissivity-reducing coating in a sol-gel process. First, a sol containing the precursors of the coating is provided and ripened. The ripening can involve hydrolysis of the precursors and/or a (partial) reaction between the precursors. This sol is referred to in the context of the invention as a precursor sol and contains silicon oxide precursors in a solvent. The precursors are preferably silanes, in particular tetraethoxy silanes or methyl triethoxysilane (MTEOS). However, alternatively, silicates can also be used as precursors, in particular sodium, lithium, or potassium silicates, for example, tetramethyl orthosilicate, tetraethyl orthosilicate (TEOS), tetraisopropyl orthosilicate, or organo-silanes of the general form $R^2{}_n Si(OR^1)_{4-n}$. Here, preferably $R^1$ is an alkyl group; $R^2$ is an alkyl, epoxy, acrylate, methacrylate, amine, phenyl, or vinyl group; and n is an integer from 0 to 2. Silicon halides or alkoxides can also be used. The solvent is preferably water, alcohol (in particular ethanol), or a water-alcohol mixture.

The precursor sol is then mixed with a pore former dispersed in an aqueous phase. The purpose of the pore former is to create the pores in der silicon oxide matrix, so to speak, as a placeholder in the creation of the anti-reflection coating. The shape, size, and density of the pores is determined by the shape, size, and concentration of the pore former. The pore size, pore distribution, and pore density can be selectively controlled by the pore former and reproducible results are ensured. Polymer nanoparticles can, for example, be used as pore formers, preferably PMMA nanoparticles (polymethyl methacrylate), but also, alternatively, nanoparticles of polycarbonates, polyesters, or polystyrenes, or copolymers of methyl(meth)acrylates and (meth)acrylic acid. Instead of polymer nanoparticles, nanodroplets of an oil in the form of a nano-emulsion can also be used. Of course, it is also conceivable to use different pore formers.

The solution thus obtained is applied to the interior-side surface of the substrate. This is reasonably done by wet chemical methods, for example, by dip coating, spin coating, flow coating, by application using rollers or brushes, or by spray coating. This can be followed by drying, with the solvent being evaporated. This drying can be carried out at ambient temperature or by separate heating (for example, at a temperature of up to 120° C.). Before applying the coating to the substrate, the surface is typically cleaned by methods known per se.

Then, the sol is condensed. During this process, the silicon oxide matrix forms around the pore former. The condensation can include a temperature treatment, for example, at a temperature of, for example, up to 350° C. if the precursors have UV cross-linkable functional groups (for example, methacrylate, vinyl, or acrylate groups), the condensation can include a UV treatment. Alternatively, for suitable precursors (for example, silicates) the condensation can include an IR treatment. Optionally, solvent can be evaporated at a temperature of up to 120° C.

Then, the pore former is optionally removed again. For this purpose, the coated substrate is preferably subjected to a heat treatment at a temperature of at least 400° C., preferably at least 500° C., wherein the pore formers decompose. Organic pore formers are carbonised. The heat treatment can be carried out as part of a bending process or a thermal tempering process. The heat treatment is preferably carried out over a period of at most 15 min, particularly preferably at most 5 min. In addition to removing the pore formers, the heat treatment can also be used to complete the condensation and thus to densify the coating, which improves its mechanical properties, in particular its stability.

Instead of using the heat treatment, the pore former can also be dissolved out of the coating by solvents. In the case of polymer nanoparticles, the corresponding polymer must be soluble in the solvent, for example, in the case of PMMA nanoparticles, tetrahydrofuran (THF) can be used.

Removal of the pore former is preferred, creating empty pores. In principle, however, it is also possible to leave the pore former in the pores. Provided it has a different refractive index from the silicon oxide, an anti-reflective effect is also achieved in this manner. The pores are then filled with the pore former, for example, with PMMA nanoparticles. Hollow particles can also be used as pore formers, for example, hollow polymer nanoparticles such as PMMA nanoparticles or hollow silicon oxide nanoparticles. If such a pore former is left in the pores and not removed, the pores have a hollow core and an edge region filled with the pore former.

The sol-gel method described enables production of an anti-reflection layer with a regular, homogeneous distribution of pores. The pore shape, size, and density can be selectively adjusted and the coating has low tortuosity.

Other than the emissivity-reducing coating and the anti-reflection coating, the interior-side surface of the substrate preferably has no other layers or coatings.

The substrate is made of an electrically insulating material, in particular a rigid material, preferably glass or plastic. In a preferred embodiment, the substrate contains soda lime glass, but can, in principle, also contain other types of glass, for example, borosilicate glass or quartz glass. In another preferred embodiment, the substrate contains polycarbonate (PC) or polymethyl methacrylate (PMMA). The substrate can be largely transparent or also tinted or coloured. The substrate preferably has a thickness from 0.1 mm to 20 mm, typically from 1 mm to 5 mm. The substrate can be planar or curved.

The substrate can be joined to an outer pane to form a laminated pane. The outer pane is preferably made of glass, in particular soda lime glass and preferably has a thickness from 0.1 mm to 20 mm, typically from 2 mm to 5 mm. Alternatively, plastics such as PMMA or PC are also suitable for the outer pane. The intermediate layer between the substrate and the outer pane is typically made of at least one thermoplastic film, preferably based on polyvinyl butyral (PVB), ethylene vinyl acetate (EVA), or polyurethane (PU). Typical film thicknesses are in the range from 0.2 mm to 1 mm, for example, 0.38 mm or 0.76 mm.

In a further development of the invention, the interior-side surface of the outer pane facing the intermediate layer is equipped with a sun protection coating. This is understood to mean an IR reflective coating whose reflection properties are in particular pronounced in the near IR range, in contrast to the emissivity-reducing coating. In particular, coatings with one or more functional layers based on silver are particularly suitable. In addition, the sun protection coating typically includes further dielectric layers, which serve, for example, as anti-reflection layers, matching layers, or blocking layers. Such sun protection coatings are well-known to the person skilled in the art. The heat input into the interior can be further reduced by the sun protection coating.

The invention further includes the use of a pane according to the invention in means of transportation for traffic on land, in the air, or on water. The pane is preferably used as a window pane, for example, as a roof panel, side pane, rear pane, or windshield of a vehicle, in particular a motor vehicle.

The coatings (emissivity-reducing coating and anti-reflection coating) according to the invention are transparent, i.e., they do not noticeably reduce vision through the pane. The absorption of the coating is preferably from approx. 1% to approx. 20% in the visible spectral range. The "visible spectral range" means the spectral range from 380 nm to 780 nm.

The emissivity-reducing coating and the anti-reflection coating are typically applied to the entire surface of the substrate, possibly with the exception of a perimetral edge region and/or other locally limited region, which, for example, can be used for data transmission. The coated portion of the substrate surface is preferably at least 90%, particularly preferably 100%.

In a preferred embodiment, the pane according to the invention has transmittance in the visible spectral range of less than 10%. Such panes are, in particular, suitable as roof panels. The low transmittance can be achieved by means of a tinted substrate and/or (in the case of a laminated pane) by means of a tinted outer pane and/or a tinted intermediate layer.

The interior-side emissivity of the pane according to the invention is preferably less than or equal to 45%, particularly preferably less than or equal to 35%, most particularly preferably less than or equal to 30%. "Interior-side emissivity" refers to the measure indicating how much thermal radiation the pane emits into an interior, for example, of a building or of a vehicle, in the installed position compared with an ideal heat emitter (a black body). In the context of the invention, emissivity means the normal emissivity at 283 K according to the standard EN 12898.

If a first layer is arranged above a second layer, this means, in the context of the invention, that the first layer is arranged farther from the substrate than the second layer. If a first layer is arranged below a second layer, this means, in the context of the invention, that the second layer is arranged farther from the substrate than the first layer. If a first layer is arranged above or below a second layer, this does not necessarily mean, in the context of the invention, that the first and the second layer are in direct contact with one another. One or more additional layers can be arranged between the first and the second layer, provided this is not explicitly ruled out.

In the context of the invention, if a layer or other element contains at least a material, this includes the case that the layer is made of the material, which is, in principle, also preferable. The compounds described in the context of the present invention, in particular oxides, nitrides, and carbides, can, in principle, be stoichiometric, substoichiometric or superstoichiometric, even if the stoichiometric molecular formulas are mentioned for the sake of better understanding.

If a layer is based on a material, the layer consists predominantly of this material, in particular, substantially of this material in addition to any impurities or dopants.

Refractive indices specified always refer to a wavelength of 550 nm. Thicknesses specified always refer to the geometric thickness, unless explicitly indicated otherwise.

In the following, the invention is explained in detail with reference to drawings and exemplary embodiments. The drawings are a schematic representation and not to scale. The drawings in no way restrict the invention.

Figure 2:
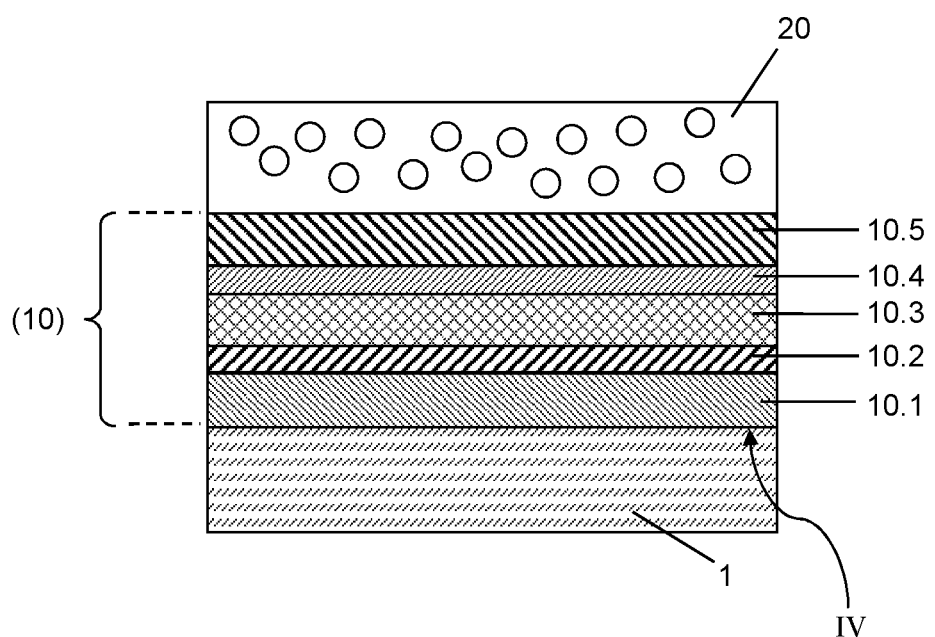
Figure 3:
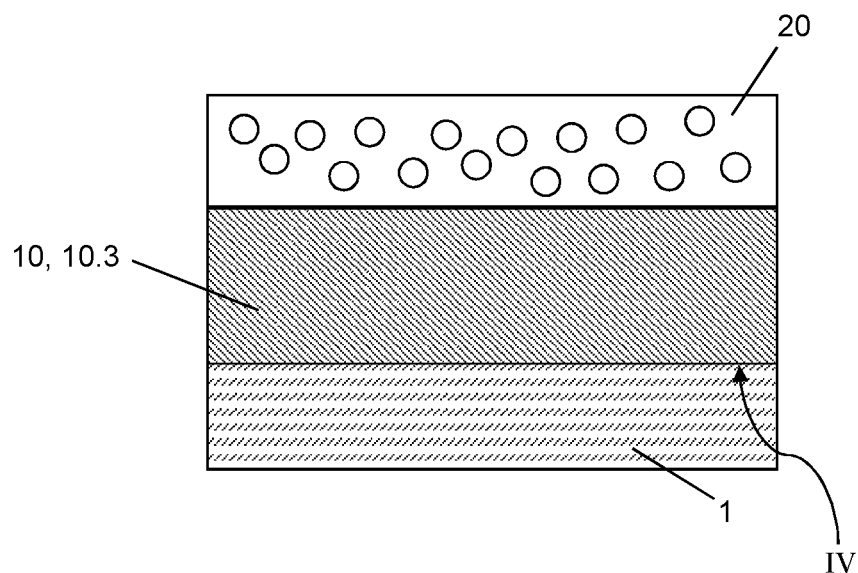
Figure 4:
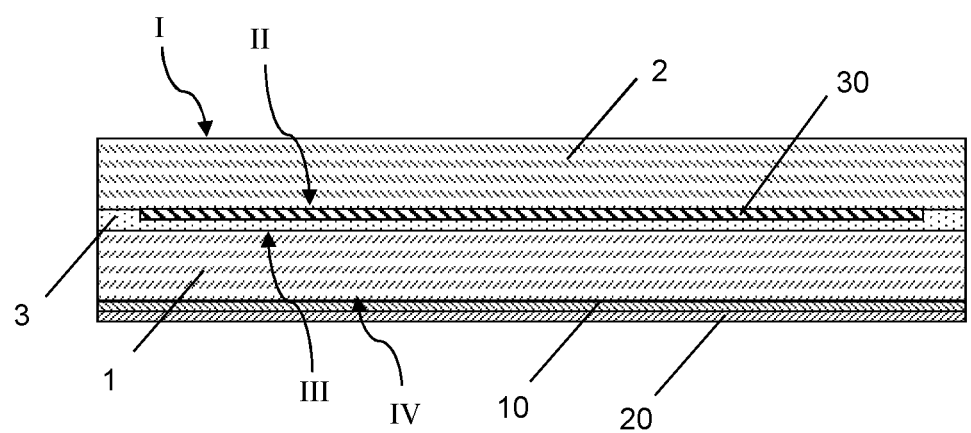

They depict:

FIG. 1 a cross-section through an embodiment of the pane according to the invention, FIG. 2 a cross-section through the substrate with the emissivity-reducing coating and the anti-reflection coating of one embodiment of the pane according to the invention, FIG. 3 a cross-section through the substrate with the emissivity-reducing coating and der anti-reflection coating of another embodiment of the pane according to the invention, FIG. 4 a cross-section through another embodiment of the pane according to the invention, FIG. 1 depicts a cross-section through an embodiment of the pane according to the invention with reduced emissivity and light reflection. The pane is implemented as a laminated pane composed of a substrate 1 and an outer pane 2 that are joined to one another via a thermoplastic intermediate layer 3. The substrate 1 functions as the inner pane of the laminated pane. The laminated pane is, for example, the roof panel of a motor vehicle. The outer pane 2 has an exterior-side surface I and an interior-side surface II. Likewise, the substrate 1 has an exterior-side surface III and an interior-side surface IV. The exterior-side surface I of the outer pane 2 and the interior-side surface IV of the substrate 1 are the exposed surfaces of the laminated pane, wherein, in the installed position, the surface I faces the external environment and the surface IV faces the interior of the vehicle. The substrate 1 and the outer pane 2 are, for example, panes of tinted soda lime glass with a thickness of 2.1 mm in each case. The intermediate layer 3, is, for example, made of a 0.76-mm-thick, tinted film of polyvinyl butyral (PVB).

An emissivity-reducing coating 10 (low-E coating) is applied on the exposed, interior-side surface IV of the substrate 1. The coating 10 improves the thermal comfort in the interior of the vehicle, by reflecting thermal radiation of the pane as well as portions of the solar radiation when outside temperatures are high and reducing the cooling of the interior when outside temperatures are low. An anti-reflection coating 20 is applied on the emissivity-reducing coating 10. It reduces the light reflection of the surface IV with the emissivity-reducing coating 10 such that, for example, an electronic display in the region of the dashboard is less strongly reflected on the roof panel.

FIG. 2 depicts an embodiment of the coatings 10, 20 according to the invention on the substrate 1. The emissivity-reducing coating 10 is a sequence of thin layers, which, starting from the substrate 1, consists of the following individual layers: a blocking layer 10.1 against alkali diffusion, a lower anti-reflection layer 10.2, a layer 10.3 based on ITO, a barrier layer 10.4 for regulating oxygen diffusion, and an upper anti-reflection layer 10.5. The individual layers of the coating 10 were deposited by magnetron-enhanced cathodic sputtering.

The anti-reflection layer 20 is a single layer of nanoporous silicon oxide ($SiO_2$) that was deposited on the emissivity-reducing coating 10 using the sol-gel method. The pore size and density were adjusted by means of pore formers such that the refractive index of the anti-reflection coating is approx. 1.3.

The materials and layer thicknesses are summarised in Table 1, by way of example.

TABLE 1

| Layer | Reference Characters | | Material | Thickness |
|---|---|---|---|---|
| Anti-reflection coating | 20 | | Nanoporous $SiO_2$ | 100 nm |
| Upper anti-reflection layer | 10.5 | 10 | $SiO_2$:Al | 38 nm |
| Barrier layer | 10.4 | | $Si_3N_4$:Al | 8 nm |
| Electrically conductive layer | 10.3 | | ITO | 68 nm |
| Lower anti-reflection layer | 10.2 | | $SiO_2$:Al | 20 nm |
| Blocking layer | 10.1 | | $Si_3N_4$:Al | 25 nm |
| Substrate | | 1 | Soda lime glass, tinted | 2.1 mm |
| Intermediate layer | | 3 | PVB | 0.76 mm |
| Outer panes | | 2 | Soda lime glass, tinted | 2.1 mm |

FIG. 3 depicts another embodiment of the coatings 10, 20 according to the invention on the substrate 1. The emissivity-reducing coating 10 is a single layer 10.3 based on fluorine-doped tin oxide ($SnO_2$:F), which was applied pyrolytically during the production of the substrate 1 using the float process. Here, the anti-reflection layer 20 is also a single layer of nanoporous silicon oxide ($SiO_2$), deposited on the emissivity-reducing coating 10 using the sol-gel method. The pore size and density were adjusted by means of pore formers such that the refractive index of the anti-reflection coating is approx. 1.3.

The materials and layer thicknesses are summarised in Table 2, by way of example.

TABLE 2

| Layer | Reference Character | | Material | Thickness |
|---|---|---|---|---|
| Anti-reflection coating | 20 | | Nanoporous $SiO_2$ | 140 nm |
| Electrically conductive layer | 10.3 | 10 | $SnO_2$:F | 380 nm |
| Substrate | | 1 | Soda lime glass, tinted | 3.85 mm |

In the embodiment of Table 1, the pane is implemented as a laminated pane; in the embodiment of Table 2, as a thermally prestressed single glass pane. This is to be understood as merely exemplary. Likewise, it is possible to use the emissivity-reducing coating 10 implemented as a thin layer stack (Table 1) on a single glass pane and the pyrolytic emissivity-reducing coating 10 (Table 2) on a laminated pane.

FIG. 4 depicts a cross-section through an embodiment of the pane according to the invention with reduced emissivity and light reflection. Substrate 1, outer pane 2, intermediate layer 3, emissivity-reducing coating 10, and anti-reflection coating 20 are implemented as in FIG. 1. In addition, an IR reflective coating 30 is applied on the interior-side surface II of the outer pane. The coating 30 serves as a sun protection coating. It is a thin layer stack comprising multiple silver layers and numerous dielectric layers. Such IR reflecting coatings based on silver are known per se. They reflect solar radiation, in particular in the near IR range, and thereby further improve thermal comfort by reducing the heating of the laminated pane and the transmittance of IR radiation.

EXAMPLES

Table 3 shows materials and layer thicknesses of two Examples 1 and 2 of the type according to FIG. 2 as well as a Comparative Example 1. The refractive index of the anti-reflection layer 20 is 1.3 in each case. The substrate 1 is a tinted, thermally prestressed soda lime glass pane (light transmittance of 10% at a theoretical thickness of 4 mm), which forms the pane according to the invention as single pane safety glass (ESG).

The two Examples 1 and 2 according to the invention differ slightly in the layer thicknesses of the individual layers of the emissivity-reducing coating 10. In particular, by adjusting the thickness of the dielectric layers, the optical properties of the pane can be influenced, for example, the reflection colour. The Comparative Example 1 has the same the emissivity-reducing coating 10 as Example 1, but has no anti-reflection coating 20.

TABLE 3

| | | Thickness | | |
|---|---|---|---|---|
| Layer | Material | Example 1 | Example 2 | Comparative Example 1 |
| 20 | Nanoporous $SiO_2$ | 100 nm | 100 nm | — |
| 10.5 | $SiO_2$ | 40 nm | 40 nm | 40 nm |
| 10.4 | $Si_3N_4$ | 9 nm | 9 nm | 9 nm |
| 10.3 | ITO | 72 nm | 72 nm | 72 nm |
| 10.2 | $SiO_2$ | 20 nm | 10 nm | 20 nm |
| 10.1 | $Si_3N_4$ | 30 nm | 25 nm | 30 nm |
| 1 | Glass, tinted | 3.85 mm | 3.85 mm | 3.85 mm |

Table 4 shows materials and layer thicknesses of an Example 3 of the type according to FIG. 3 as well as a Comparative Example 2. The refractive index of the anti-reflection layer 20 is 1.3 in each case. The substrate 1 was a tinted soda lime glass pane (light transmittance of 10% at a theoretical thickness of 4 mm). The Comparative Example 2 has the same emissivity-reducing coating 10 as Example 3, but has no anti-reflection coating 20.

TABLE 4

| | | Thickness | |
|---|---|---|---|
| Layer | Material | Example 3 | Comparative Example 2 |
| 20 | Nanoporous $SiO_2$ | 140 nm | — |
| 10.3 | $SnO_2$:F | 380 nm | 380 nm |
| 1 | Glass, tinted | 3.85 mm | 3.85 mm |

Table 5 summarises the integral reflection values of the example panes. The values of the reflectance $R_L$ shown were determined by simulation with the software CODE. The reflection values characterise the interior-side light reflection under irradiation with light source A and an observation angle of 8° ($R_L(A)$ 8°) and 60° ($R_L(A)$ 60°), respectively. The integral reflection values $R_L(A)$ 8° and $R_L(A)$ 60° are obtained by integrating the reflection spectrum in the visible spectral range from 380 nm to 780 nm.

TABLE 5

| | Example 1 | Example 2 | Comparative Example 1 | Example 3 | Comparative Example 2 |
|---|---|---|---|---|---|
| $R_L(A)$ 8° | 0.6% | 1.5% | 3.9% | 1.8% | 7.9% |
| $R_L(A)$ 60° | 2.2% | 2.0% | 9.5% | 2.0% | 12.6% |

It can be seen that the light reflection is significantly reduced by the anti-reflection coating 20 according to the invention. In particular, the value $R_L(A)$ 60° enables a conclusion about the extent to which reflections on the roof panel are perceived as disturbing by the occupants of the back seat. It was also shown that the anti-reflection coating 20 adheres well to the emissivity-reducing coating 10 and has sufficient long-term stability for use in a motor vehicle.

Table 6 shows materials and layer thicknesses of another Example 4 according to the invention. The embodiment of Example 4 is similar to that of Examples 1 and 2. The emissivity-reducing coating 10 has, in contrast thereto, no upper anti-reflection layer 10.5, but consists only of the blocking layer 10.1 against alkali diffusion, the lower anti-reflection layer 10.2, the layer 10.3 based on ITO, and the barrier layer 10.4 for regulating oxygen diffusion. Here, again, the individual layers of the coating 10 were deposited by magnetron-enhanced cathodic sputtering. The anti-reflection layer 20 is, again, a single layer of nanoporous silicon oxide ($SiO_2$) that was deposited on the emissivity-reducing coating 10 using the sol-gel method. The pore size and density were adjusted by means of pore formers such that the refractive index of the anti-reflection coating is approx. 1.3.

Table 6 also shows the materials and layer thicknesses of another Comparative Example 3. Comparative Example 3 does not have a nanoporous anti-reflection coating 20 according to the invention. Compared to Examples 1 and 2 and Comparative Example 1, the thickness of the upper anti-reflection layer 10.5 is significantly increased such that the person skilled in the art could assume from it that the upper anti-reflection layer 10.5 at least partially fulfils the function of the anti-reflection coating 20. Alternatively, Comparative Example 3 can be used for comparison with Example 4, with the emissivity-reducing coating 10 designed identically and the anti-reflection coating 20 according to the invention of Example 4 being replaced by an alternative anti-reflection coating, which was deposited by magnetron-enhanced cathodic sputtering.

TABLE 6

| | | Thickness | |
|---|---|---|---|
| Layer | Material | Example 4 | Comparative Example 3 |
| 20 | Nanoporous $SiO_2$ | 100 nm | — |
| 10.5 | $SiO_2$ | — | 140 nm |
| 10.4 | $Si_3N_4$ | 9 nm | 9 nm |
| 10.3 | ITO | 72 nm | 72 nm |
| 10.2 | $SiO_2$ | 20 nm | 20 nm |
| 10.1 | $Si_3N_4$ | 30 nm | 30 nm |
| 1 | Glass, tinted | 3.85 mm | 3.85 mm |

Table 7 summarises the integral reflection values of Example 4 and Comparative Example 3 (analogous to Table 5).

TABLE 7

|  | Example 4 | Comparative Example 3 |
|---|---|---|
| $R_L(A)$ 8° | 0.1% | 4.2% |
| $R_L(A)$ 60° | 3.5% | 7.3% |

It can be seen that with Example 4, reflection values are achieved that are in a range similar to those of Examples 1-3. It is also possible to dispense with the upper anti-reflection layer 10.5 of the emissivity-reducing coating 10—its function is taken over, as it were, by the anti-reflection coating 20.

Likewise, it can be seen that with Comparative Example 3, significantly higher reflection values are achieved than with the examples. This is true in particular for the observation angle of 60°. The angle-dependence of the reflection behaviour is thus greater without the nanoporous anti-reflection coating 20. In addition, the deposition of such a thick $SiO_2$ layer by cathodic sputtering is costly and time-consuming.

LIST OF REFERENCE CHARACTERS (1) substrate
(2) outer pane
(3) thermoplastic intermediate layer
(10) emissivity-reducing coating
(10.1) blocking layer against alkali diffusion
(10.2) lower anti-reflection layer
(10.3) layer based on a transparent conductive oxide (TCO)
(10.4) barrier layer to regulate oxygen diffusion
(10.5) upper anti-reflection layer
(20) anti-reflection coating
(30) sun protection coating
(I) exterior-side surface of the outer pane 2
(II) interior-side surface of the outer pane 2
(III) exterior-side surface of the substrate 1
(IV) interior-side surface of the substrate 1

The invention claimed is:

1. A vehicle pane with reduced emissivity and light reflection, comprising:
a substrate having an exposed interior-side surface,
an emissivity-reducing coating containing at least one layer based on a transparent conductive oxide (TCO) on the interior-side surface and an upper anti-reflection layer with a refractive index of at most 1.8, and
an anti-reflection coating consisting of nanoporous silicon oxide or nanoporous silicon oxide doped with aluminium, zirconium, titanium, boron, tin, or zinc on the emissivity-reducing coating such that the upper anti-reflection layer with a refractive index of at most 1.8 of the emissivity-reducing coating is arranged between the transparent conductive oxide (TCO) and the anti-reflection coating, the anti-reflection coating being in direct contact with the upper anti-reflection layer,
wherein the anti-reflection coating has pores with a size from 1 nm to 500 nm,
wherein the anti-reflection coating has a refractive index from 1.2 to 1.4 and a thickness from 50 nm to 150 nm, and
wherein the upper anti-reflection layer comprises at least one of silicon oxide, doped silicon oxide, aluminum oxide, magnesium fluoride and calcium fluoride.

2. The vehicle pane according to claim 1, wherein the anti-reflection coating is a sol-gel coating, in which closed and/or open nanopores are formed.

3. The vehicle pane according to claim 1, wherein the layer based on a transparent conductive oxide (TCO) includes fluorine-doped tin oxide (FTO) or antimony-doped tin oxide (ATO) and has a thickness from 100 nm to 600 nm.

4. The vehicle pane according to claim 1, wherein the emissivity-reducing coating comprises the following layers, starting from the substrate:
a blocking layer against alkali diffusion with a refractive index of at least 1.9,
a lower anti-reflection layer with a refractive index of at most 1.8,
the layer based on a transparent conductive oxide, which is indium tin oxide,
a barrier layer to regulate oxygen diffusion with a refractive index of at least 1.9, and
said upper anti-reflection layer with a refractive index of at most 1.8.

5. The vehicle pane according to claim 4, wherein
the blocking layer contains a metal, a nitride, or a carbide,
the lower anti-reflection layer contains an oxide,
the barrier layer contains a metal, a nitride, or a carbide,
the upper anti-reflection layer contains at least one of silicon oxide, doped silicon oxide and aluminum oxide.

6. The vehicle pane according to claim 5, wherein
the blocking layer contains silicon nitride or silicon carbide,
the lower anti-reflection layer contains silicon oxide,
the barrier layer contains silicon nitride or silicon carbide, and
the upper anti-reflection layer contains silicon oxide.

7. The vehicle pane according to claim 4, wherein
the blocking layer has a thickness from 10 nm to 50 nm,
the lower anti-reflection layer has a thickness from 5 nm to 100 nm,
the layer based on a transparent conductive oxide has a thickness from 50 nm to 150 nm,
the barrier layer has a thickness from 5 nm to 20 nm,
the upper anti-reflection layer has a thickness from 10 nm to 100 nm.

8. The vehicle pane according to claim 7, wherein
the blocking layer has a thickness from 20 nm to 40 nm,
the lower anti-reflection layer has a thickness from 10 nm to 50 nm,
the layer based on a transparent conductive oxide has a thickness from 60 nm to 100 nm,
the barrier layer has a thickness from 7 nm to 12 nm, and
the upper anti-reflection layer has a thickness from 30 nm to 70 nm.

9. The vehicle pane according to claim 1, wherein the pores have a size from 20 nm to 80 nm.

10. The vehicle pane according to claim 1, wherein the anti-reflection coating has a refractive index from 1.25 to 1.35.

11. A transportation vehicle for traffic on land, in the air, or on water, with a comprising the vehicle pane with reduced emissivity and light reflection according to claim 1.

12. A method for producing a vehicle pane with reduced emissivity and light reflection, comprising:
providing a substrate having an exposed interior-side surface;
applying an emissivity-reducing coating, which comprises at least one layer based on a transparent conductive oxide (TCO), and an upper anti-reflection layer with a refractive index of at most 1.8, to the exposed interior-side surface of the substrate; and depositing an anti-reflection coating consisting of nanoporous silicon oxide or nanoporous silicon oxide doped with aluminium, zirconium, titanium, boron, tin, or zinc on the emissivity-reducing coating such that the upper anti-reflection layer with a refractive index of at most 1.8 of the emissivity-reducing coating is arranged between the transparent conductive oxide (TCO) and the anti-reflection coating, the anti-reflection coating being in direct contact with the upper anti-reflection layer, wherein the anti-reflection coating has pores with a size from 1 nm to 500 nm, wherein the anti-reflection coating has a refractive index from 1.2 to 1.4 and a thickness from 50 nm to 150 nm, and wherein the upper anti-reflection layer comprises at least one of silicon oxide, doped silicon oxide, aluminum oxide, magnesium fluoride and calcium fluoride.

13. The method according to claim 12, wherein the anti-reflection coating is applied in in a sol-gel process, by
  providing a precursor sol that contains silicon oxide precursors in a solvent,
  mixing the precursor sol with a pore former,
  applying the solution obtained to the interior-side surface of a substrate, and
  condensing the precursor sol.

14. The method according to claim 13, wherein the pore former is removed after condensation of the precursor sol.

15. The method according to claim 14, wherein the pore former is implemented as polymeric nanoparticles, and wherein the removal of the pore former is achieved by a heat treatment at a temperature of at least 400° C.

16. The method according to claim 14, wherein the pore former is implemented as polymeric nanoparticles, and wherein the removal of the pore former is achieved by dissolving with a solvent.

* * * * *